No. 666,791. Patented Jan. 29, 1901.
J. G. BAILEY & H. CHENEY.
MULCHING MACHINE.
(Application filed Oct. 23, 1899.)
(No Model.) 4 Sheets—Sheet 3.
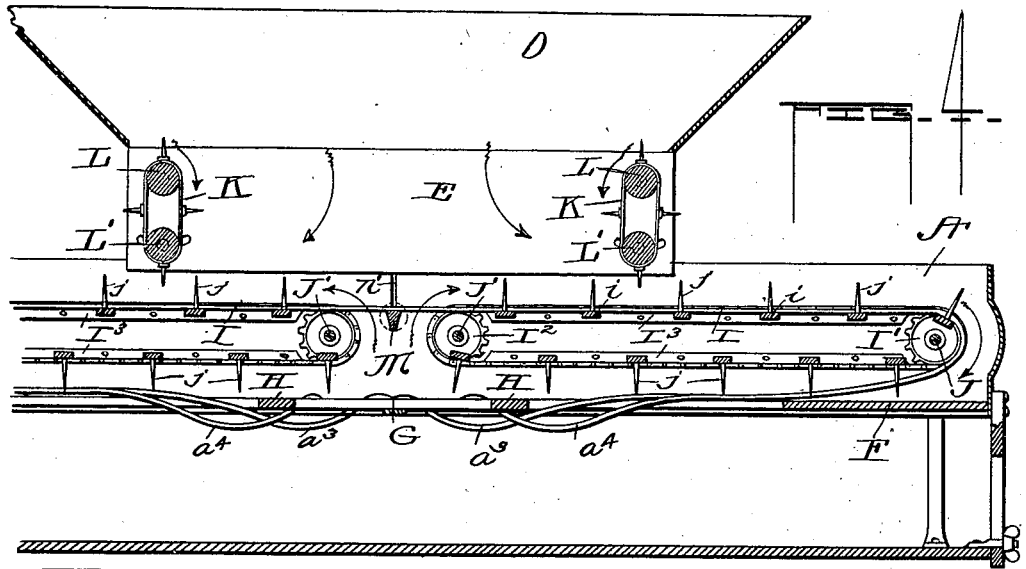
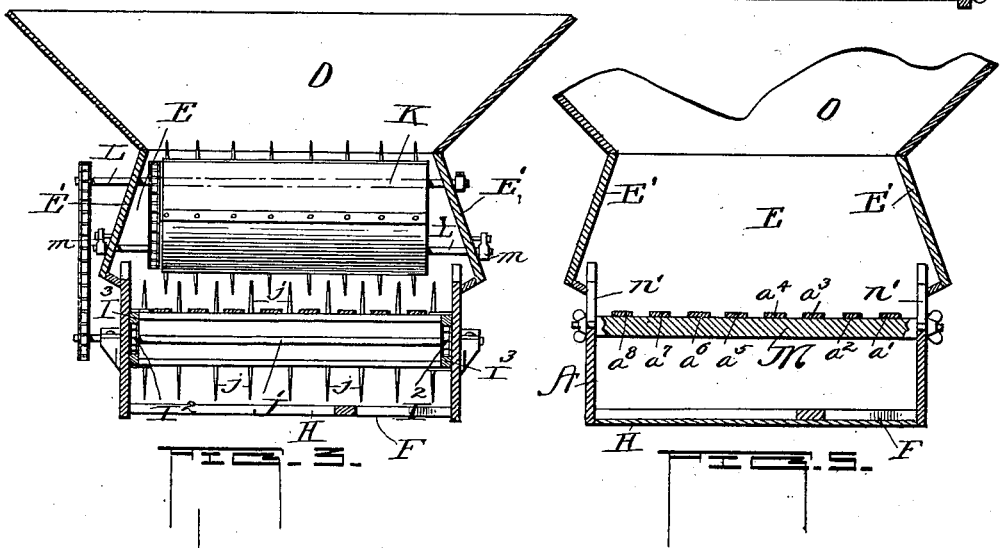
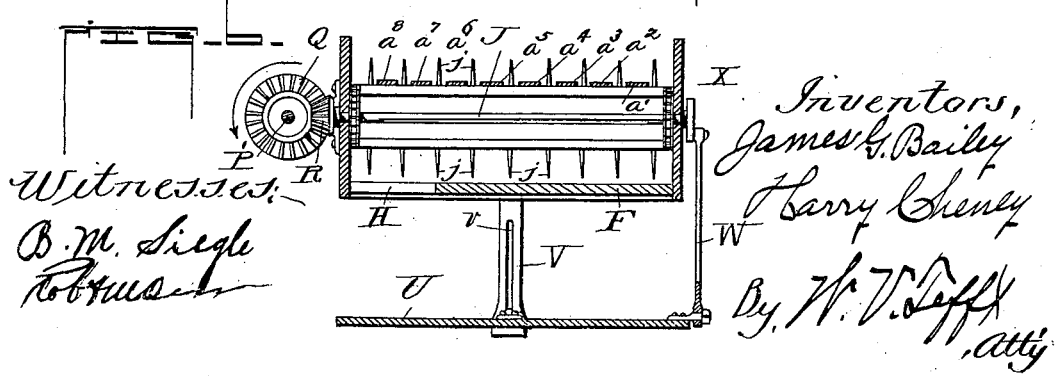
Witnesses:
B. M. Siegle
Rob Hus
Inventors,
James G. Bailey
Harry Cheney
By W. V. Defft
Atty No. 666,791. Patented Jan. 29, 1901.
J. G. BAILEY & H. CHENEY.
MULCHING MACHINE.
(Application filed Oct. 23, 1899.)
(No Model.) 4 Sheets—Sheet 4.
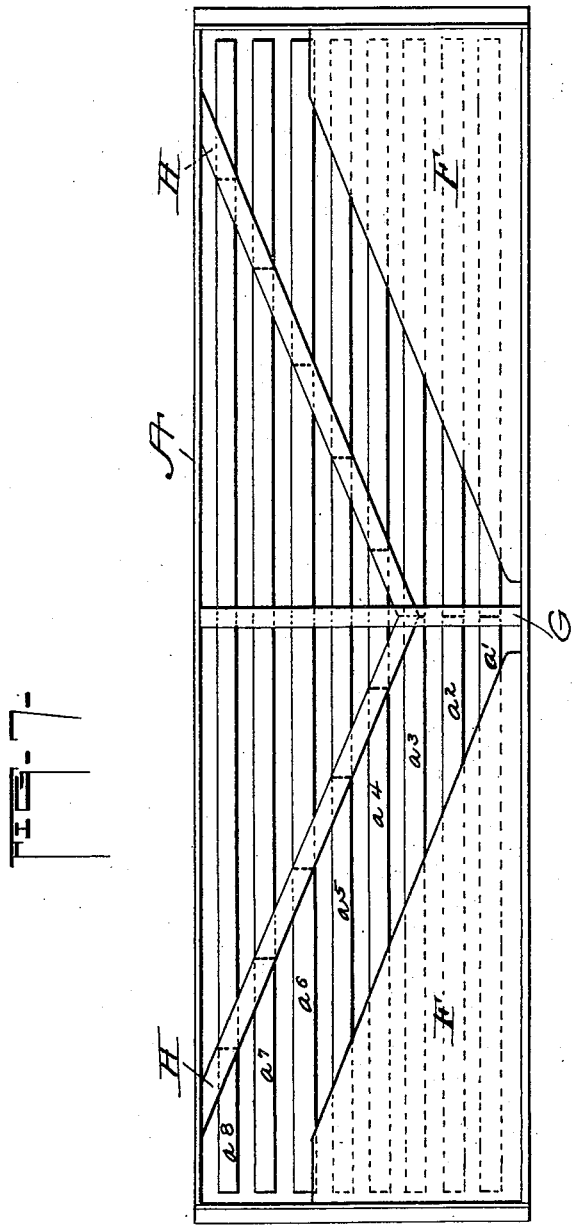

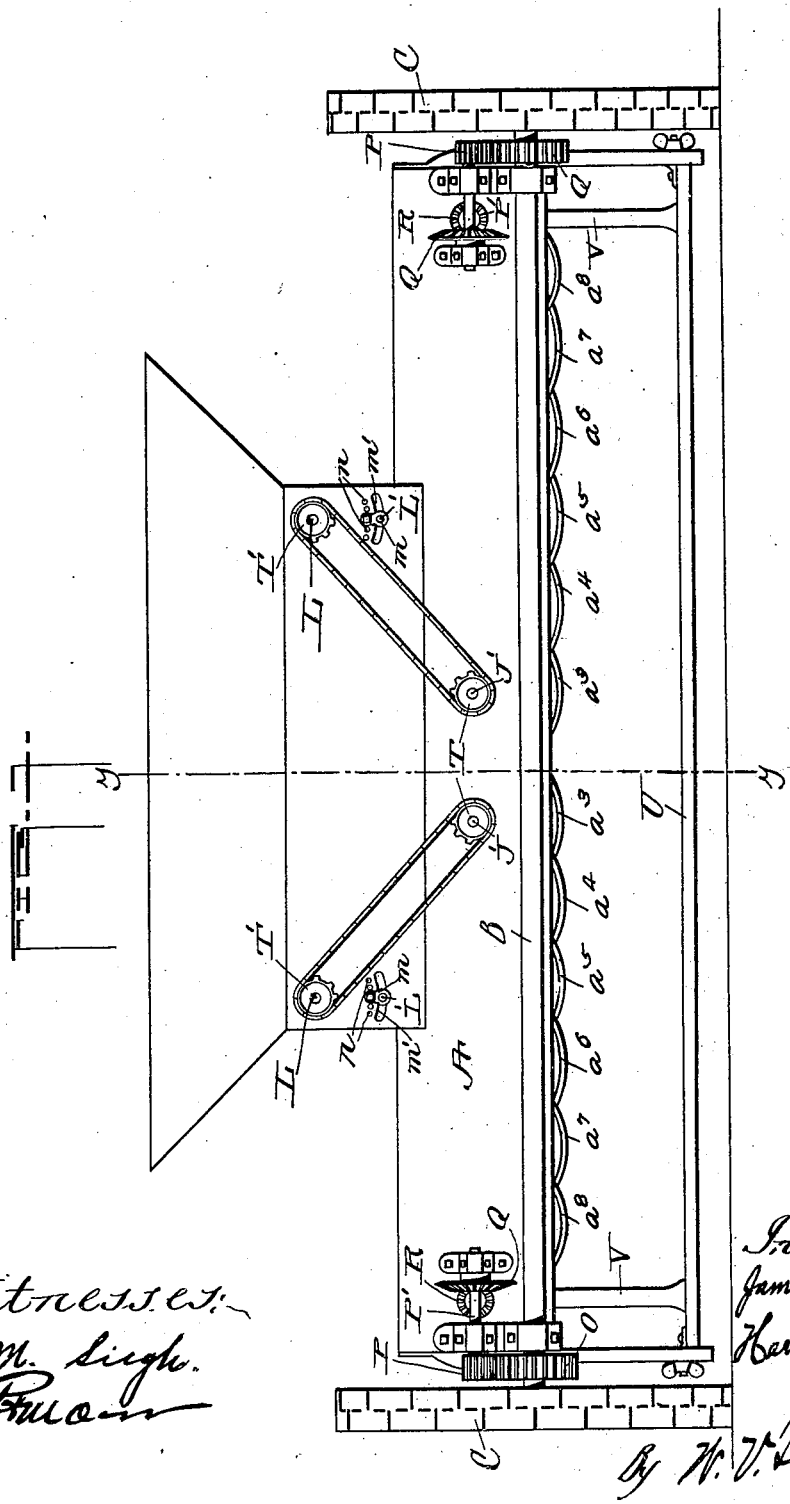

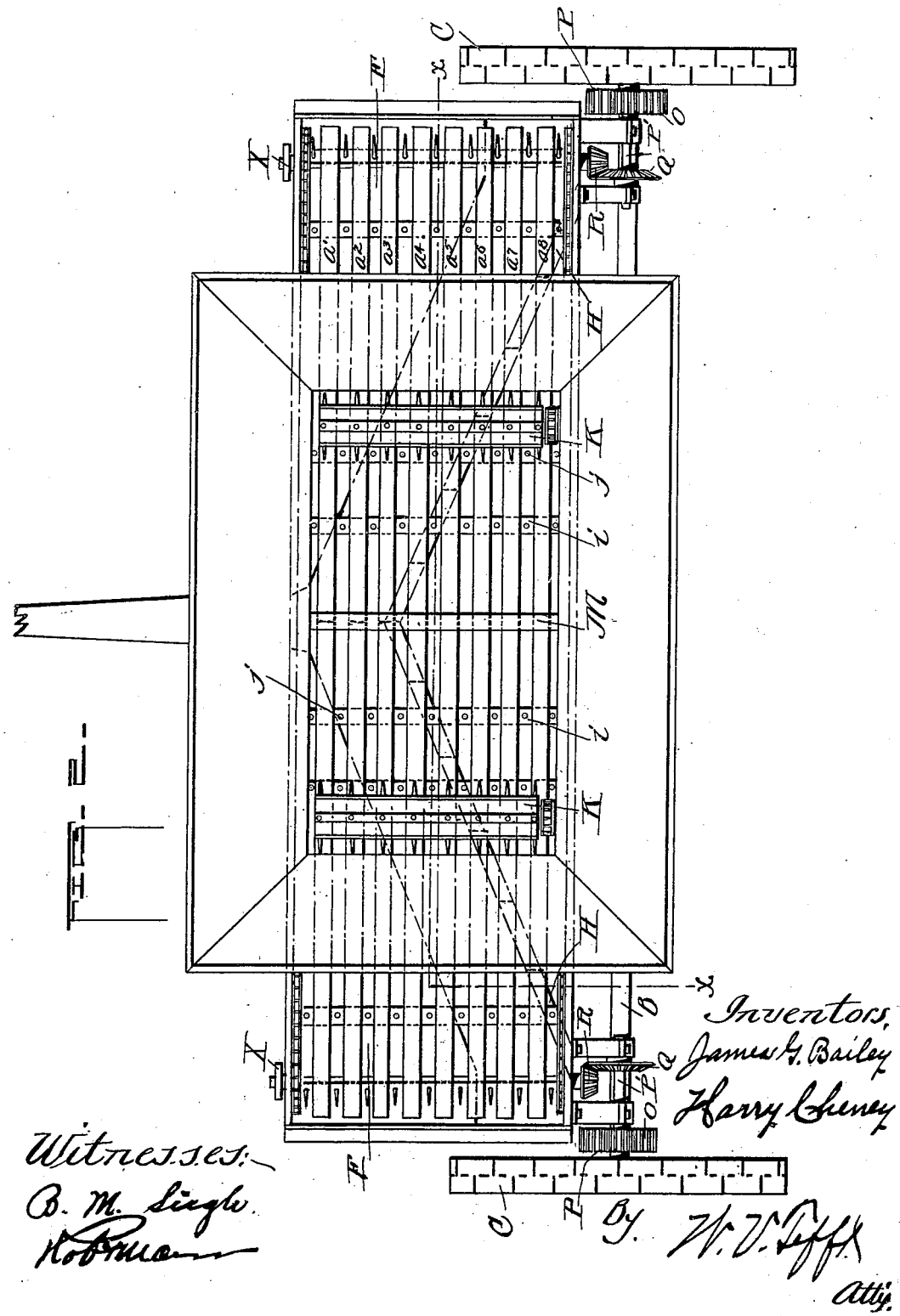

UNITED STATES PATENT OFFICE.

JAMES G. BAILEY AND HARRY CHENEY, OF DELAVAN, ILLINOIS; SAID CHENEY ASSIGNOR TO SAID BAILEY.

MULCHING-MACHINE.

SPECIFICATION forming part of Letters Patent No. 666,791, dated January 29, 1901.

Application filed October 23, 1899. Serial No. 734,435. (No model.)

*To all whom it may concern:*

Be it known that we, JAMES G. BAILEY and HARRY CHENEY, citizens of the United States, residing at Delavan, in the county of Tazewell and State of Illinois, have invented certain new and useful Improvements in Mulching-Machines; and we do hereby declare that the following is a full, clear, and exact description of the invention, which will enable others skilled in the art to which it appertains to make and use the same.

Our invention relates to a mulching-machine which is adapted to travel over a field and distribute mulching material—as, for instance, straw—evenly and uniformly upon the surface of the ground.

The invention consists, essentially, of mechanical appliances to a vehicle structure that are adapted to receive and gradually feed or deposit the straw or mulching substance and to separate and spread the same and deposit it in an even and uniform manner.

The essential features of our invention consist of a receiving-hopper and endless feeding-belts mounted and operated within said hopper and carried substantially in a vertical position. Endless feeding-belts supported in the main framework of the machine in the same horizontal plane are adapted to convey and distribute the mulching material. A series of slats extend substantially the full width of the machine upon the upper face of the horizontally-placed belts and connect at the middle point with a vertical adjustable bar, and at the sides of the machine the said strips bear over the feeding-belts extending around the same and underneath, where the said strips terminate at varying graduated points and are deflected downwardly and then upwardly before meeting the frame-piece to which they are attached, the said slats upon the upper face being purposed to serve as a bed for receiving deposits of mulching material from the hopper, and the portion of the slats extending and deflected from the feeding-belts and pins serves to dislodge the material at the desired points and to cause the same to drop upon the distributing-board.

Our invention further consists in the detail construction of the mechanical parts above specified and means adapted for shifting or otherwise operating the same and of a reciprocating distributing-board and other details of the construction hereinafter more particularly specified.

That our invention may be more fully understood reference is had to the accompanying drawings, in which—

Figure 1 shows in elevation the rear portion of our machine, illustrating particularly the general frame construction thereof and the initial power producing and conveying mechanism. Fig. 2 is a plan view of our machine, showing the general frame construction, the hopper, the several conveyers, &c., and the general manner of mounting the machine for operation. Fig. 3 is a sectional view on the line *y y* of Fig. 1 through the hopper and main-frame parts and showing the manner of mounting the feeding-belts and the manner of communicating power to the operating parts. Fig. 4 is a cross-section on the line *x x* of Fig. 2 through the machine at right angles from that shown in Fig. 3 and illustrates in detail the construction of various working parts. Fig. 5 is a vertical section through the center of the hopper and main frame, but omits the feeding-belts. The purpose of the figure is to illustrate the manner of supporting the series of slats and the facilities provided for adjusting the same. Fig. 6 is a detailed view showing the manner of mounting the horizontally-carried feeding-belts, the manner in which power is applied, and means provided to reciprocate the distributing-board. Fig. 7 is an outline view, inverted, of the machine-frame.

In describing the machine similar letters will refer to similar parts throughout all the figures.

In carrying out our invention we provide the rectangular frame A, which forms the main support for the various working parts of the machine. This main frame is connected with the axle or cross-piece B, which said axle or cross-piece is mounted upon wheels C, which are purposed to be provided with the usual ribs that are usually applied to the ordinary power-wheels. Upon this main frame A we purpose to construct a hopper, which may be formed in the manner shown in the drawings, with the upper portion D deflected outwardly to provide a wide roomy opening to receive the deposit of feed or mulching material and with the lower portion E of the hopper having the general rectangular form, but with the opposite sides E' deflected outwardly in the manner shown in the drawings and then inwardly to connect with the main frame A, as best shown in Figs. 3 and 5.

The main object to be attained in the construction of our machine is the uniform distribution over the surface of the ground of the mulching material, and in order to accomplish this we must separate the material that is deposited in the machine from its amalgamated or matted form into thin layers before it is in condition to be deposited in the above-said uniform manner. In order to accomplish this, we provide, as hereinbefore stated, first, a hopper to receive the deposits of material, and, second, we have provided a table or bed below the hopper upon which it is purposed the material is to be spread out or upon which it is to be properly separated. This table or bed consists of the series of strips $a'$, $a^2$, $a^3$, $a^4$, $a^5$, $a^6$, $a^7$, and $a^8$, extending across substantially the entire width of the machine, as shown in Figs. 2 and 4, and are then bent in the form of a half-circle and return underneath toward the central portion of the machine. The main frame A is provided with the triangular-shaped bottom pieces F F, or rather so much of the bottom thereof is covered with a tight bottom, as is shown in Figs. 2 and 7 and designated by F F. The strips $a'$, $a^2$, and $a^3$ continuing around on the under side finally connect with the cross-piece G, and the strips $a^4$, $a^5$, $a^6$, $a^7$, and $a^8$ continuing around underneath connect with the diagonally-placed strips or frame-pieces H, terminating at varying distances from the ends of the table, as indicated by the dotted lines in Fig. 2 and as indicated by two examples, as shown in Fig. 4 and in the outline plan view of the machine inverted as illustrated in Fig. 7. The ends of all the strips at points just before they connect with the frame-pieces G and H are curved downwardly, as shown in Fig. 4. Also all of the strips have a general decline as they bear underneath the bed toward their points of connection with the bars. Underneath the table formed by these strips $a'$, &c., are provided the endless feeding-belts I I, formed each with a sprocket-chain on each side, carried upon the sprocket-wheels I' and $I^2$, which said sprocket-wheels are carried upon shafts J and J'. $I^3 I^3$ are guide-strips supporting and guiding the chains through lug projections which bear upon said strips. These sprocket-chains are connected with a series of cross-bars $i$, and in each bar there are set a series of pins $j$. These feeding-belts are adapted to be driven in opposite directions, as indicated by the course of the arrows in Fig. 4. These pins are in horizontal lines both lengthwise and crosswise of the belts, and as the belts are moved the pins travel between the slats that form the table and also between the slats as they bear underneath the table.

Within the hopper are placed the vertically-carried feeding-belts K, which may be formed of canvas or any other suitable material and carried over rollers L L and L' L' and are provided with suitable strips, to which are fixed rows of pins. These belts K, arranged as shown, are capable of lateral adjustment at their lower ends adapted to regulate the feed of the material through the hopper to the table below and may also be adjusted to prevent the choking up of the hopper as the material is being fed therethrough. The lower rollers L' L' are journaled in hangers $m\ m$, which are adapted to be adjusted within the arc-shaped slots $m'\ m'$ by means of a pin connected with each hanger, which is adapted to be inserted in the pin-holes $n$, as shown in Fig. 1, there being a similar set of boxings, arc slots, and pin-holes on the opposite side of the hopper corresponding in location with those shown in said figure. By means of said adjustable boxings the rollers L' L' may be adjusted as desired to facilitate the work of the belts upon the varying conditions of the material that may be met with in the operation of the machine. The lower portion of the hopper is formed on two of the sides with the deflected portions E' E' for the purpose of resisting any tendency of the material lodged in that portion of the hopper from working upwardly, the feeding-belt on the other side serving to prevent such a tendency.

The table is formed by the slats $a'$, &c., which are all secured to the cross-piece M, which is adjusted at the center of the table and extends entirely across the same, as shown in Fig. 5, and is secured within slots $n'$ in the main frame A by pin projections from each end properly threaded and the application of thumb-screws thereto, as shown in said figure. The bar M may be adjusted up or down within the slots and secured at any desired point. By means of the adjustable bar the table may be raised or lowered at will.

The various working parts of the machine are driven from the power-wheels C, which are fixed to the axle B. Upon the said axle are fixed the cog-wheels O O, which mesh with the cog-wheels P P, which are fixed upon shafts P' P', which said shafts are mounted in suitable boxes on frame A. Q Q are beveled cog-wheels which mesh with the beveled cog-wheels R R, which are fixed upon the belt-driving shafts J, one of which is shown in Figs. 4 and 6. As the machine travels the cog-wheels O O transmit power and movement through cog-wheels P, shaft P', and beveled cog-wheels Q and R to the belt-driving shafts J, and the sprocket-wheels I', fixed thereon, carrying the sprocket-chains I, which connect with sprocket-wheels $I^2$ on shaft J', cause the endless feeding-belts to travel in the direction indicated by the course of the arrows as shown in Fig. 4. Upon the rear ends of the shafts J' J' are fixed the sprocket-wheels T, which are connected with sprocket-wheels T' T' on the ends of the shafts L L. The connection of the belt-shafts J' with the belt-shafts L causes the belts in the hopper to travel in the direction indicated by the course of the arrows as shown in Fig. 4.

In carrying out our invention the horizontally-carried feeding-belts I are purposed to separate mulching material suitably to facilitate in distributing and to free the material thus separated at graduated points beneath the belts. As an aid in the distribution we have provided the reciprocating distributing-board U, which is shown in position in Fig. 1, but a portion of which and the mechanical operation thereof is more particularly shown in Fig. 6. The reciprocating board is adapted to be hinged at one edge upon legs V V, the hinges having an adjustable relation with said legs through and by means of slots $v$ therein. With the outer edge of the reciprocating board and with each end thereof are connected the bars W W, which said bars are eccentrically connected with the disk wheels X X on belt-driving shafts J and are driven thereby to cause the distributer to be reciprocated for the purpose of dislodging materials dropping thereon from the feeding-belts.

In the operation of the machine, the various parts thereof having first been arranged substantially in the relation shown in the drawings and the machine being moved through the field, muching material—as, for instance, straw—is designed to be fed or deposited (from a load of such material, which may be driven or carried along with the moving machine) gradually into the hopper D, which may be reasonably well filled at all times. The material so deposited in the hopper will pass downward therein by the natural gravity force—the weight of material on top—aided by the vertically-carried feeding-belts K K, and will be fed from the horizontally-carried feeding-belts I I, which said belts running in opposite directions with the upwardly-projecting pins $j$, traveling between the slats $a'$, &c., forming the table, will carry and distribute the material along upon the table and will gradually, regularly, and evenly convey the same from off the table and underneath the same and from thence to the edge of the diagonally-bearing bottom F F. It will be observed that these strips $a'$, &c., gradually bear away from the belts as they extend underneath the same and then suddenly drop away therefrom. The bearing of these strips in this manner serves to separate the material from the pin projections from the belts just as soon as the edge of the diagonally-formed bottom frame part F is reached, and at the graduated points where the edge of the bottom frame-piece F is reached the material is dropped and distributed a little at a time along the entire width of the machine.

The distributing-board U is adapted to extend the entire width and length of the horizontally-carried feeding-belts, so that all of the material that is dropped from the belts is deposited upon said board, and the constant vibration of said board will cause the material to be gradually and evenly dislodged therefrom and distributed on the ground.

By raising or lowering the cross-piece M the degree of engagement of the pins $j$ with the material may be regulated. The drawings show the table depressed to the maximum point, in which position the material will be separated the quickest and in the largest quantities, resulting in the heaviest distribution of mulching material; but by raising the table by degrees from its maximum lowered position to its maximum raised position there will be obtained a gradually-decreased distribution. Of course it will be understood that the table may be fixed at any point desired to accommodate the character of distribution required.

The rollers L L' may be shifted, as before explained. By shifting the rollers toward each other the feed upon the table may be accelerated and by moving them away from each other the feed is lessened, according to the degree of movement either way.

The reciprocating distributing-board may be given a greater or less degree of slant or pitch, as desired, by merely raising or lowering the hinged edge by means of the connection with the slots $v$ in the bars V.

Having thus fully described our invention, what we claim, and desire to secure by Letters Patent, is—

1. In a mulching-machine, the combination with a traveling vehicle of endless feeding-belts suitably mounted to travel and provided with rows of pins thereon, a slatted table bearing over said belts and between the pins thereon, and underneath the belts stopping at graduated points thereunder and properly deflected over the body of the feeding-belts and to and from the ends of the pins thereon, a suitable hopper located above the belts and suitable power mechanism adapted to operate the belts, all substantially as described and shown.

2. In a mulching-machine, the combination with a pair of oppositely-traveling endless feeding-belts provided with rows of pins thereon of a slatted table bearing over the top of the belts and between the pins thereon and extending underneath the said belts and terminating at different graduated points thereunder and suitably deflected therefrom each at a different point, all substantially as described and shown.

3. In a mulching-machine, the combination with a pair of oppositely-traveling endless feeding-belts suitably mounted and driven provided with a series of slats thereon, provided with rows of pins of an adjustable slatted table bearing between the rows of pins, a hopper located above the table and means for operating the said belts, all substantially as described and shown.

4. In a mulching-machine, the combination with a pair of endless feeding-belts suitably mounted and driven, provided with a series of slats thereon, provided with rows of pins of an adjustable slatted table bearing between the rows of pins, a hopper located above the table, vertically-carried endless feeding-belts properly supported and driven within the mouth of the hopper and means for operating said belts, all substantially as described and shown.

5. In a mulching-machine, the combination with the framework of a vehicle of a pair of endless feeding-belts adapted to travel in opposite directions and suitably supported therein, consisting of sprocket-chains connected by series of bars provided with rows of pins thereon, a series of slats supported above the belts and bearing between the rows of pins and extending underneath the belts and connected with diagonally-disposed frame-pieces, diagonally-formed bottom pieces covering a portion of the bottom of the framework within which the belts are supported, a suitable hopper located above the belts and suitable power mechanism connected with said belts to operate the same, all substantially as described and shown.

6. In a mulching-machine, the combination with the framework of a vehicle of a pair of endless feeding-belts adapted to travel in opposite directions and suitably supported therein, consisting of sprocket-chains connected by series of bars provided with rows of pins thereon, a series of slats supported above the belts and bearing between the rows of pins and extending underneath the belts and connected with diagonally-disposed frame-pieces, diagonally-formed bottom pieces covering a portion of the framework within which the belts are supported, a suitable hopper located above the belts and provided with substantially vertically carried endless feeding-belts and suitable power mechanism adapted to drive the said belts, all substantially as described and shown.

7. In a mulching-machine, the combination with the framework of a vehicle structure with rectangular sides and the bottom portion thereof partially closed by diagonally-formed bottom pieces leaving a triangular-shaped open portion, of a pair of endless feeding-belts suitably mounted and driven in opposite directions and provided with suitable cross-slats in which are set a series of pins, a series of slats bearing over the feeding-belts and between the rows of pins thereon and extending underneath said belts and connected with diagonally-disposed bars each at varying distances from the center of the frame and deflected from the belt, all substantially as described and shown.

8. In a mulching-machine, the combination with the framework of a vehicle structure with rectangular sides and the bottom portion thereof partially closed by diagonally-disposed bottom pieces leaving a triangular-shaped open portion, of a pair of endless feeding-belts suitably mounted and driven in opposite directions and provided with suitable cross-slats in which are set a series of pins, a series of adjustable slats forming a table bearing over the top of the feeding-belts and extending underneath said belts and connected with diagonally-disposed bars each at varying distances from the center of the frame and deflected from the belts, and means for adjusting the slats up and down, all substantially as described and shown.

9. In a mulching-machine, the combination with the frame of a vehicle structure with rectangular sides and the bottom portion thereof partially closed by diagonally-disposed bottom pieces leaving a triangular-shaped open portion, of a pair of endless feeding-belts suitably mounted and driven in opposite directions and provided with suitable cross-slats in which are set a series of pins, a series of slats bearing over the feeding-belts and between rows of pins thereon and extending underneath said belts and connected with diagonally-disposed bars each at varying distances from the center of the frame and deflected from the belts, a hopper located above the feeding-belts adapted to receive deposits of mulching material, all substantially as described and shown.

10. In a mulching-machine, the combination with the frame of a vehicle structure with rectangular sides and the bottom portion thereof partially closed by diagonally-disposed bottom pieces leaving a triangular-shaped open portion, of a pair of endless feeding-belts suitably mounted and driven in opposite directions and provided with suitable cross-slats in which are set a series of pins, a series of slats bearing over the feeding-belts and between rows of pins thereon and extending underneath said belts and connected with diagonally-disposed bars each at varying distances from the center of the frame and deflected from the belts, a hopper located above the feeding-belts provided with horizontally-carried endless feeding-belts on two of its sides and each of the other sides deflected outwardly and then inwardly to connect with the frame and means for operating the belts, all substantially as described and shown.

11. In a mulching-machine, the combination with the endless feeding-belts I, suitably supported to travel and formed of side-bearing sprocket-chains connected by slats $i$, in which are set pins $j$, the slats $a'$, $a^2$, $a^3$, $a^4$, $a^5$, $a^6$, $a^7$, and $a^8$, extending over the top of the belts and also underneath the same and terminating at varying distances thereunder and deflected from the body of the feeding-belts, all substantially as described and shown.

12. In a mulching-machine, the combination with the endless feeding-belts I, suitably supported to travel and formed of side-bearing sprocket-chains connected by slats $i$, in which are set pins $j$, the vertically-adjustable slats $a'$, $a^2$, $a^3$, $a^4$, $a^5$, $a^6$, $a^7$ and $a^8$, extending over the top of the belts and also underneath the same and terminating at varying distances thereunder and deflected from the body of the belts, all substantially as described and shown.

13. In a mulching-machine, the combination with the endless feeding-belts I, suitably supported to travel and formed of side-bearing sprocket-chains connected by slats $i$, in which are set pins $j$, the slats $a'$, $a^2$, $a^3$, $a^4$, $a^5$, $a^6$, $a^7$, and $a^8$ connected with the adjustable bar M, extending over the top of the belts and also under the same and terminating at varying distances thereunder and deflected from the body of the belts, all substantially as described and shown.

14. In a mulching-machine, the combination with the frame A, of a vehicle, provided with the triangular bottom pieces F, F, and the diagonally-disposed pieces H, H, of the endless feeding-belts I, I, formed with side-bearing sprocket-chains supported on sprocket-wheels I', I², and connected by slats $i$, provided with pins $j$, the adjustable bar M, the slats $a'$, $a^2$, $a^3$, $a^4$, $a^5$, $a^6$, $a^7$ and $a^8$, bearing over the top of the belts and between rows of pins thereon, said slats extending underneath the belts and deflected downwardly and then upwardly and connecting with cross-pieces H, H, and means for driving the belts, all substantially as described and shown.

15. In a mulching-machine, the combination with the frame A, of a vehicle, provided with the triangular bottom pieces F, F, and the diagonally-disposed cross-pieces H, H, of the endless feeding-belts I, I, formed with side-bearing sprocket-chains supported on sprocket-wheels I' I², and connected by slats $i$, provided with pins $j$, the adjustable bar M, the slats $a'$, $a^2$, $a^3$, $a^4$, $a^5$, $a^6$, $a^7$ and $a^8$, connected therewith and bearing over the top of the belts and between rows of pins thereon, said slats extending underneath the belts and deflected downwardly and then upwardly and connecting with cross-pieces H, H, and means for driving the feeding-belts, all substantially as described and shown.

16. In a mulching-machine, the combination with the frame A, of a vehicle, provided with the triangular bottom pieces F, F, and the diagonally-disposed cross-pieces H, H, of the endless feeding-belts I, I, with side-bearing sprocket-chains supported on sprocket-wheels I' I², and connected by slats $i$, provided with pins $j$, the adjustable bar M, the slats $a'$, $a^2$, $a^3$, $a^4$, $a^5$, $a^6$, $a^7$ and $a^8$ bearing over the top of the belts and between rows of pins thereon, said slats extending underneath the belts and deflected downwardly and then upwardly and connecting with cross-pieces H, H, the hopper formed by the frame parts D, E and E', all substantially as described and shown.

17. In a mulching-machine, the combination with the frame A, of a vehicle, provided with the triangular bottom pieces F, F, and the diagonally-disposed cross-pieces H, H, of the endless feeding-belts I, I, formed with side-bearing sprocket-chains supported on sprocket-wheels I' I², and connected by slats $i$, provided with pins, the adjustable bar M, the slats $a'$, $a^2$, $a^3$, $a^4$, $a^5$, $a^6$, $a^7$ and $a^8$ connected therewith bearing over the top of the feeding-belts and between rows of pins thereon, said slats extending underneath the belts and deflected downwardly and then upwardly and connecting with cross-pieces H, H, the hopper formed by the frame parts D, E and E', all substantially as described and shown.

18. In a mulching-machine, a pair of endless feeding-belts carried in a horizontal position in the framework of a vehicle and provided with a number of rows of pins, a series of slats extending over and beneath the belts, a suitable hopper located above the feeding-belts, a reciprocating distributing-board located below the belts and suitable mechanism adapted to operate the several working parts of the machine, all substantially as described and shown.

19. In a mulching-machine, the combination with a vehicle of a pair of endless feeding-belts carried in a horizontal position in the framework of a vehicle and provided with a number of rows of pins, a series of slats extending over and beneath the feeding-belts, a suitable hopper located above the belts, a reciprocating distributing-board located below the belts and suitable mechanism adapted to operate the several working parts of the machine, all substantially as described and shown.

20. In a mulching-machine, the combination with the endless feeding-belts I, I, formed of sprocket-chains connected with bars $i$, provided with pins, of the adjustable slatted table formed of the slats $a'$, $a^2$, $a^3$, $a^4$, $a^5$, $a^6$ $a^7$ and $a^8$; the hopper formed of the frame parts D, E and E', provided with the vertically-carried endless feeding-belts K, therein, the dislodging-strips, consisting of extensions of the strips that form the table, which extend underneath the horizontally-carried belts and are deflected therefrom and terminate at different distances from the ends of the belts; the reciprocating distributing-board U, adjustably hinged at one side to leg V, and mechanism adapted to drive the belts and for reciprocating the distributing-board, all substantially as described and shown.

21. In a mulching-machine, the combination with a vehicle, of the substantially rectangular frame A, provided with the triangular bottom pieces F, F, and the diagonally-disposed cross-pieces H, H, the endless feeding-belts I, I, formed of sprocket-chains having side projections and connected by bars $i$, in which are set pins $j$, the guide-strips $I^3$, upon which the projections from the sprocket-chains bear and travel, the adjustable table arranged above the feeding-belts and extending underneath the same and connecting with the cross-pieces H, H, a suitable hopper located above the belts, a reciprocating distributing-board and suitable mechanism adapted to operate the belts and reciprocating distributing-board, all substantially as described and shown.

In testimony whereof we affix our signatures in presence of two witnesses.

JAS. G. BAILEY.
HARRY CHENEY.

Witnesses:
D. G. BAILEY,
W. H. PAWSON, Jr.